(12) United States Patent
Gouch

(10) Patent No.: US 7,702,181 B2
(45) Date of Patent: Apr. 20, 2010

(54) METHOD AND APPARATUS FOR FORMING A MULTIPLE FOCUS STACK IMAGE

(75) Inventor: Martin Philip Gouch, Herts (GB)

(73) Assignee: FFEI Limited, Hemel Hempstead (GB)

( * ) Notice: Subject to any disclaimer, the term of this patent is extended or adjusted under 35 U.S.C. 154(b) by 1309 days.

(21) Appl. No.: 11/159,208

(22) Filed: Jun. 23, 2005

(65) Prior Publication Data

US 2005/0286800 A1 Dec. 29, 2005

(30) Foreign Application Priority Data

Jun. 24, 2004 (GB) .................................. 0414201.4

(51) Int. Cl.
G06K 9/36 (2006.01)
G06K 9/00 (2006.01)

(52) U.S. Cl. ....................... 382/284; 382/133; 382/141; 382/154; 345/629

(58) Field of Classification Search ......... 382/141–152, 382/133, 154, 284; 250/306–311; 348/86–95, 348/125–134; 700/95–212; 29/833; 438/16; 356/426–431, 237.1–237.6; 702/35–40; 345/629–641, 419–427
See application file for complete search history.

(56) References Cited

U.S. PATENT DOCUMENTS

| | | | |
|---|---|---|---|
| 4,099,051 A | 7/1978 | Gugliotta | |
| 4,812,643 A | 3/1989 | Talbot | |
| 4,844,617 A | 7/1989 | Kelderman et al. | |
| 5,248,876 A * | 9/1993 | Kerstens et al. | 250/559.05 |
| 5,394,205 A | 2/1995 | Ochiai et al. | |
| 5,446,276 A | 8/1995 | Iyoda et al. | |
| 5,659,390 A | 8/1997 | Danko | |
| 5,763,871 A | 6/1998 | Ortyn et al. | |
| 5,793,379 A * | 8/1998 | Lapidous | 345/606 |
| 5,912,699 A | 6/1999 | Hayenga et al. | |
| 6,091,075 A | 7/2000 | Shibata et al. | |
| 6,201,619 B1 * | 3/2001 | Neale et al. | 358/505 |

(Continued)

FOREIGN PATENT DOCUMENTS

DE 200 16 490 U1 12/2000

(Continued)

OTHER PUBLICATIONS

"Entering the Age of Fluorescence Imaging in Digital Slide Technology", Hamamatsu Photonics K.K., Systems Division; 2006; Japan.

*Primary Examiner*—Aaron W Carter
(74) *Attorney, Agent, or Firm*—Sughrue Mion, PLLC

(57) ABSTRACT

A method is provided of producing a multiple focus stack image of a target. The stack image has a plurality of images of the target, each image having a corresponding focal range or position. The method utilizes relative scanning movement between the target and an array of light detectors, the array being used to repeatedly receive image information as scan lines from the target during the scan. During the scan the relative focus between the target and the array is modified between the focal range or position of the respective images so as to obtain the images in the stack. Each image is thereby formed from the image information obtained at the respective focal range or position during the scan. Apparatus for performing the method is likewise provided.

37 Claims, 18 Drawing Sheets

U.S. PATENT DOCUMENTS

| | | |
|---|---|---|
| 6,538,249 B1 * | 3/2003 | Takane et al. .................. 850/9 |
| 6,580,502 B1 | 6/2003 | Kuwabara |
| 6,711,283 B1 * | 3/2004 | Soenksen .................... 382/133 |
| 6,875,973 B2 | 4/2005 | Ortyn et al. |
| 7,015,418 B2 | 3/2006 | Cahill et al. |
| 7,109,459 B2 | 9/2006 | Kam et al. |
| 7,485,834 B2 | 2/2009 | Gouch |
| 2003/0067596 A1 | 4/2003 | Leonard |
| 2003/0160957 A1 | 8/2003 | Oldham et al. |
| 2004/0256538 A1 | 12/2004 | Olson et al. |
| 2005/0286800 A1 | 12/2005 | Gouch |
| 2006/0238847 A1 | 10/2006 | Gouch |
| 2007/0036462 A1 * | 2/2007 | Crandall et al. ............. 382/284 |
| 2007/0147673 A1 | 6/2007 | Crandall |

FOREIGN PATENT DOCUMENTS

| | | |
|---|---|---|
| EP | 1 593 957 A1 | 11/2005 |
| WO | 01/37025 A1 | 5/2001 |

* cited by examiner

Direction of traverse

Direction of traverse

Direction of traverse

Direction of traverse

METHOD AND APPARATUS FOR FORMING A MULTIPLE FOCUS STACK IMAGE

The present invention relates to a method and apparatus for forming a multiple focus stack image.

BACKGROUND TO THE INVENTION

In a number of market sectors such as medical applications samples are examined with a microscope and digital images are generated with a 2D digital camera attached to the microscope. This has a restriction of limited area of the sample viewed being captured with the digital camera. For a 40× objective a typical area is only 0.7 mm wide. Given that the active area on a microscope slide is 64×24 mm this is only a very small area of the possible sample area. One answer to this is to step and repeat otherwise known as macro dither over the whole of the sample area. A more preferred process is to use a line scan device similar to that described in U.S. Pat. No. 6,711,283 where long strips of data can be collected of 0.7 by 64 mm. Then adjacent strips can be scanned and the images butted together or stitched together as described in patent GB2206011.

As mentioned in U.S. Pat. No. 6,711,283 one problem with this long strip scanning is that the focus must be maintained over the whole length of the scan. As an example for a 40× lens with numerical aperture of 0.65 the depth of focus is around 1 micrometre. A typical microscope slide is not manufactured to hold this sort of tolerance and when mounted may flex due to the mounting method or under the force of gravity in excess of one micron. Also the sample being imaged may not itself be flat to 1 micrometre. In U.S. Pat. No. 6,711,283 this problem is addressed by separately building a focus map over the length of the scan and then adjusting the focus dynamically during scanning to fit the focus map. Unfortunately this is time consuming in building the focus map for each sample. A typical method of focusing is to scan the same area of the image at different focus levels and use a merit algorithm to determine the best focus. There are a number of merit algorithms used but an example is to take the sum of the squares of the differences between adjacent pixels. The merit algorithm produces a function, an example of which is shown in FIG. 1 where the peak (indicated by an arrow) is considered to be the point of focus.

Another method used to address this problem is to have multiple scans at different focus levels. This is called focus stacking or z stacking and is shown in FIG. 2. The idea is that at least one of the scan images is in focus at any one time and the stack of Z images 400 can be combined at a later date to give a single in focus image. Software for combining images can be obtained from a number of vendors. The problem with this method is that with small depth of focus in relation to the range of focus change in the sample, many layers of image will be needed to cover the full focus range and this will be time consuming. The line of best focus is shown at 401. At various positions 402, the images in the stack provide little useful information.

There is therefore a need to address these disadvantages.

SUMMARY ON THE INVENTION

In accordance with a first aspect of the present invention we provide a method of producing a multiple focus stack image of a target, the stack image comprising a plurality of images of the target, each image having a corresponding focal range or position, the method comprising:

causing relative scanning movement between the target and an array of light detectors, the array being used to repeatedly receive image information from the target during the scan in the form of scan lines; and, causing the relative focus between the target and the array to be modified between the said focal ranges or positions of the respective images during the scan, so as to obtain the images in the stack, wherein each image is formed from the image information obtained at the respective focal range or position during the scan.

The present invention is therefore quite different to prior art methods. In the prior methods stack images are obtained as sequential image frames, whereas in the present invention the images are obtained by scan lines. Importantly, the scan lines are obtained whilst repeatedly swapping between the different focal positions (either fixed or within a range) of the images during the scan itself and these scan lines are then used to form the images of different focus within the stack by the end of the scan. The images can be thought of as focus levels or layers. When discussing scan lines, it will be appreciated that this term encompasses the output of a number of detector lines in an array having more than one line of detectors. Nevertheless, the number of detectors along the scan line is a number of orders of magnitude greater than the small number (less than about 16) across such an array.

The invention therefore provides a significant advantage over the prior art in that relatively inexpensive equipment can be used. This also avoids the need for multiple scans of the target that can cause problems in terms of registration between the information obtained. Furthermore no additional apparatus is required to produce focussing maps beforehand. It also allows image information for different focuses for a very localised area to be obtained within a short time period and not in a later scan. This helps to ensure that no changes occur in the optics or the sample in any intervening period and conveniently provides for on-the-fly modification of focus levels across the scan in targets having significant topography.

Typically the method is repeated for a number of swathes of the target and the multiple focus stack image is obtained within a single scan of the target. Preferably, following obtaining a scan line of image information from the target for a particular image in the stack, the relative focus is modified so as to obtain the scan line for at least one other image before further scan lines (image information) are obtained for the said particular image once more. The focus may therefore be cycled between the images of the stack during the scan, the images being built up from individual scan lines. The image information may be obtained for each image for common regions or parts of the target and the relative movement may be halted during the scan to achieve this. Attentively the scanning movement can be substantially continuous and the image information obtained for each image can then be interpolated so as to form corresponding images having different focus positions or ranges within the stack.

The array may be a one-dimensional array defining a first direction with the relative scanning movement being in a direction substantially perpendicular to the first. The focus positions or ranges may be evenly or unevenly spaced in focus with respect to one another. A focus range encompasses a region of focus between two extreme focus positions bounding the range. When focus ranges are used, the focus ranges may be overlapping or non-overlapping for different images in the stack. When focus ranges are used, the method may comprise using the image information from the scan lines during the scan so as to modify the focus for obtaining subsequent scan lines for each image as the scan proceeds. A merit curve of focus as a function of focus position can be used for this and the method may then further comprise controlling the focus for images in the stack so as to span an "ideal" focus position for a particular region. The centre-most image(s) in the stack can be arranged to correspond to the ideal focus position for the regions.

The images in the stack may be used so as to produce an output image having a depth of focus according to the focus ranges or positions of the images from which it is constructed.

The array may comprise a plurality of pixels arranged in substantially the scanning direction in sub-arrays. These may be spaced apart in substantially the scanning direction and each sub-array then adapted to receive light of a corresponding colour.

In some examples the image information is obtained from adjacent regions. When an integer "m" sub-arrays are provided, preferably the sub-array spacing, in units of the region widths as seen by the array, is mn−1, where n is a non-zero integer, typically such that image information from different regions obtained at different times is interleaved.

The speed of the relative movement is determined according to the dimensions and positioning of the array.

In accordance with a second aspect of the invention we provide apparatus for producing a multiple focus stack image of a target, the stack image comprising a plurality of images of the target, each image having a corresponding focal range or position, the apparatus comprising:

an array of light detectors for receiving image information from a target in the form of scan lines;

a scan device for providing relative movement between the array and the target;

a focus device for controlling the relative focus between the array and the target, and, a control system for operating the scan device for causing relative scanning movement between the target and the array of light detectors; and further adapted for controlling the array to repeatedly receive image information from the target during the scan; and for operating the focus device for causing the relative focus between the target and the array to be modified between the said focal ranges or positions of the respective images during the scan, so as to obtain the images in the stack, wherein each image is formed from the image information obtained at the respective focal range or position during the scan.

The array may comprise a one dimensional array or a plurality of sub-arrays arranged in a direction substantially perpendicular to the direction of scanning. The number of pixels may be large, such as about 5000. A number "m" of sub-arrays may be provided, these being spaced such that the corresponding obtained image information from the regions is spaced in the image in integers of the dimension of the regions in substantially the direction of scanning. This spacing may be an actual physical spacing or an optically equivalent spacing provided for example by the use of beam splitters and physically spaced sub-arrays.

For colour images, the sub-arrays preferably each comprise filters so as to receive light corresponding to particular colours. The focus device may effect the focus by movement of the array, or the target, or when the device comprises an imaging lens then by movement of the imaging lens or component parts of the imaging lens. When the focus device comprises fold mirrors, the focus device effects the focus by movement of the fold mirrors. A window of controllable optical thickness can also be used for this purpose, this being an electro-optical active quartz window for example or a rotatable window with a variable optical thickness as a function of the rotation angle.

The apparatus and method can be used in a number of imaging applications although it finds particular advantage in microscopy where the field of view and depth of field are typically rather limited.

BRIEF DESCRIPTION OF THE DRAWINGS

A number of examples of methods and apparatus according to the present invention are now described, with reference to the accompanying drawings, in which.

DESCRIPTION OF EMBODIMENTS

Figure 1:
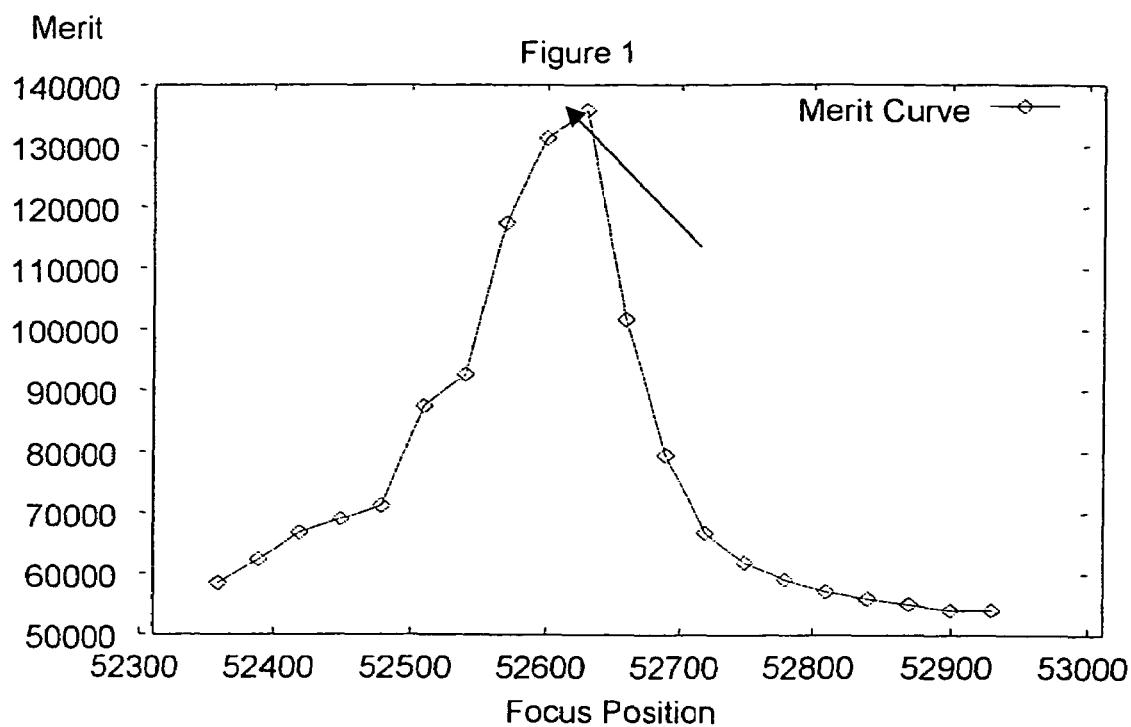
FIG. 1 shows a focus merit curve known in the art.
Figure 2:
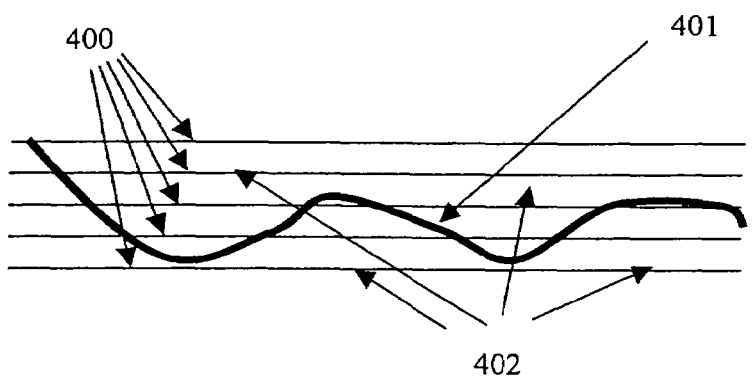
FIG. 2 shows a prior art stack image and the ideal focus.
Figure 3:
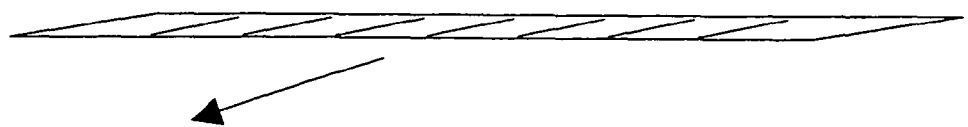
FIG. 3 is a schematic perspective view of the scanning of an array.

Normal line scanning involves a single line array of x pixels, each pixel typically corresponding to a detector in the array. For colour, a single line for each of the three colours is provided (RGB for example). This single line is then traversed in a direction perpendicular to the line of the detector array. The traverse speed is set so that after one "line time" of the detector, the detector has traversed by a distance of one pixel in the scan direction so that the next line time produces a line of pixels abutted to the previous line. This is shown in FIG. 3 where a 1D array is scanned in the direction indicated by the arrow.

Figure 4:
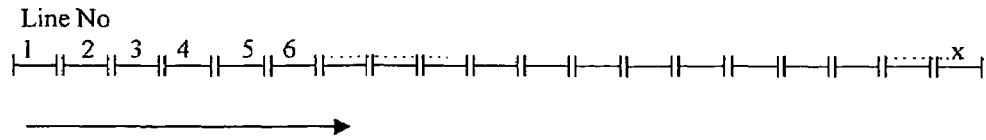
FIG. 4 shows the arrangement of scan lines in the scan.
Figure 5:
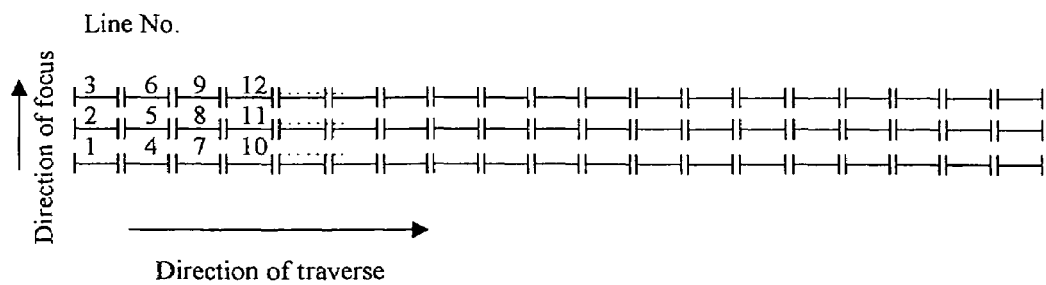
FIG. 5 shows a three focus stack with a "stop-start" scan.
Figure 5A:
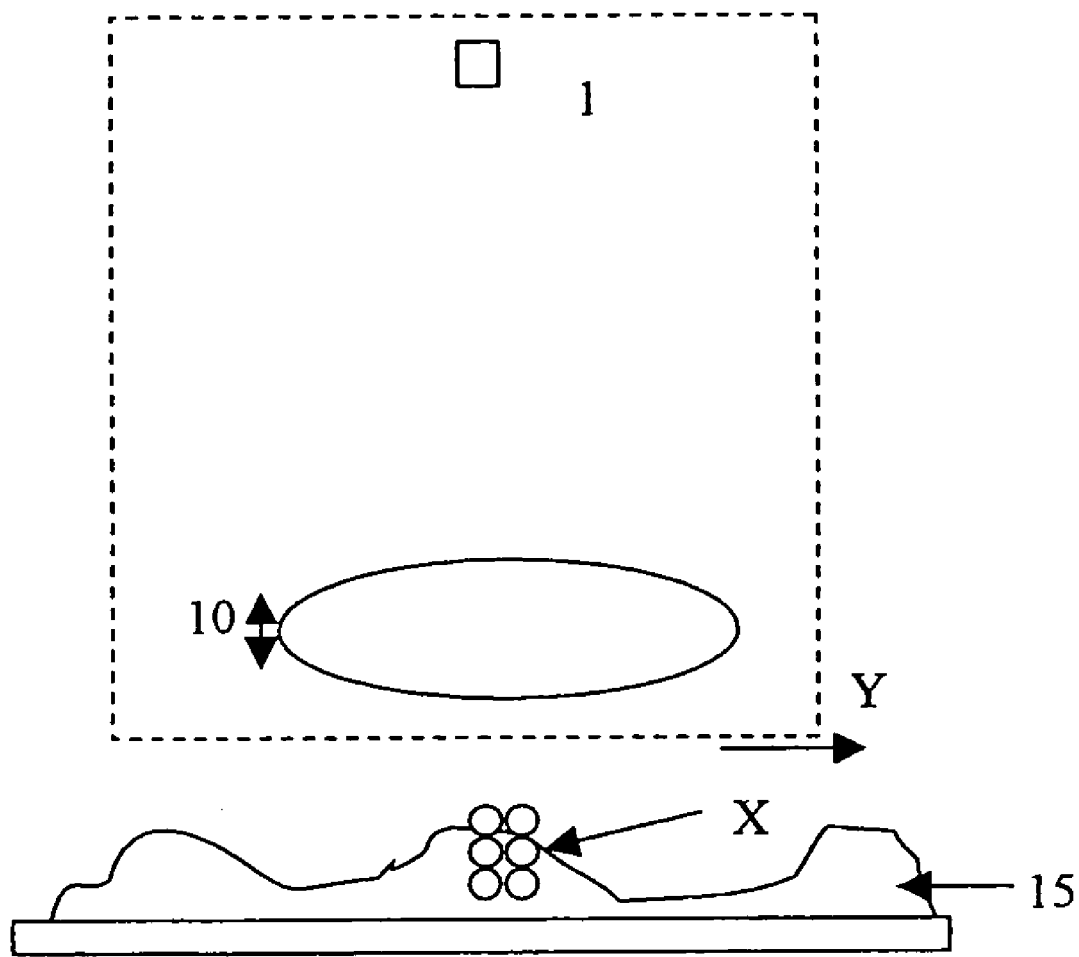
FIG. 5a shows a practical three focus stack arrangement.

FIG. 4 is a representational layout of 1D array scanning as viewed from the end of the 1D array. The direction of the traverse is indicated by the arrow, with the first scan line being labelled "1", the second "2" and so on. The simplest embodiment is to scan and to adjust the focus to different focus stack positions in between movements to the next line. FIG. 5 shows the case where three such focus stacks are obtained. This involves a stop-start traverse scan but does not require interpolation of the scan lines within the same image. The direction of focus indicated by the vertical arrow in FIG. 5 can be seen to be substantially normal to the direction of the traverse (scan) in this case. FIG. 5a shows this arrangement in more detail with the linear array 1 having a direction into the plane of the drawing. The focus variation 10 is achieved using a lens. A sample having variable thickness is shown at 15, this being positioned upon a slide as a support. The positions of the scan lines are indicated by the arrow X whereas the direction of the scan is shown at Y. In this embodiment the traverse has a "stop-start" action in the traverse which is not always desirable as stopping and starting a traverse mechanism can lead to errors in position which show up as jitter in images.

Figure 6:
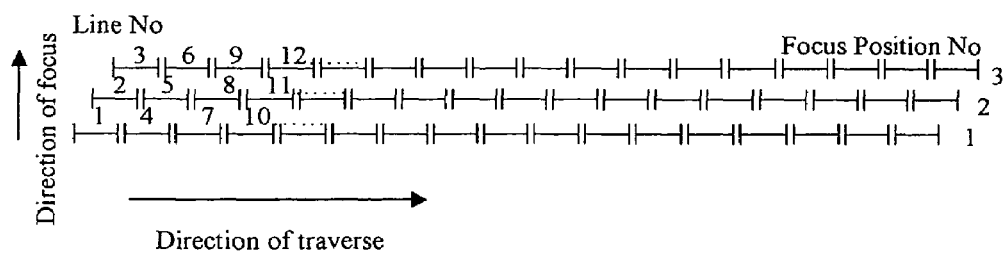
FIG. 6 shows a three focus stack with a smooth scan.
Figure 7:
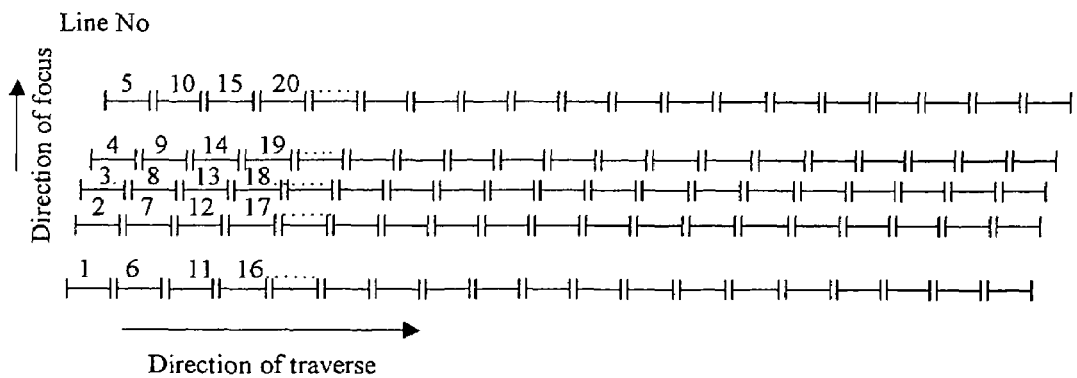
FIG. 7 shows uneven image spacing in the stack.

In another embodiment the traverse can be arranged to be smooth (a constant scan velocity) but three times slower than that shown in FIG. 4 and produce a pattern as shown in FIG. 6. Interpolation methods can then be used to realign each z stack image with the adjacent image if this is required. Although these embodiments have shown three focus stack images it is perfectly possible to produce as many focus stack images from 2 upwards to any practical number. Also it is not necessary for these focus stack images to be equally spaced apart so it is possible to have for instance a 5 stack image with three central stacks and 2 outlying focus stacks. This is shown in FIG. 7 where the lines 1 and 5 are spaced apart from the more closely spaced lines 2,3 and 4.

Figure 8:
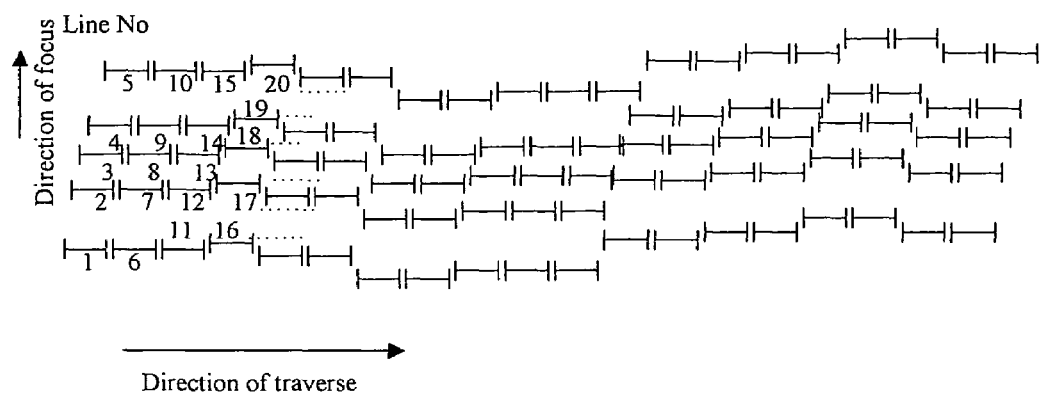
FIG. 8 shows non-planar images in the stack.

It is not required that the focus stacks should remain in a constant plane. This is illustrated in FIG. 8. This situation may occur where the system for obtaining the stack image either follows a predetermined non-planar trajectory during the scan, or follows a non-planar surface in the sample by repeatedly determining the position of best focus during the scan.

Figure 9:
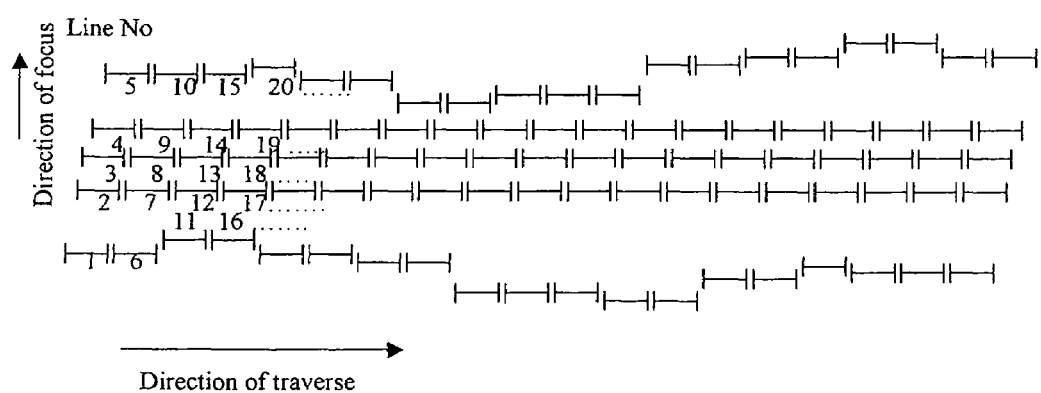
FIG. 9 shows uneven separation between the images during the scan.

As is illustrated in FIG. 9, there need not be a constant separation between lines in adjacent images within the stack. In FIG. 9 for example, the upper and lower images in the stack exhibit an inconstant separation whereas the three central image lines have a constant separation across the scan.

Figure 10A:
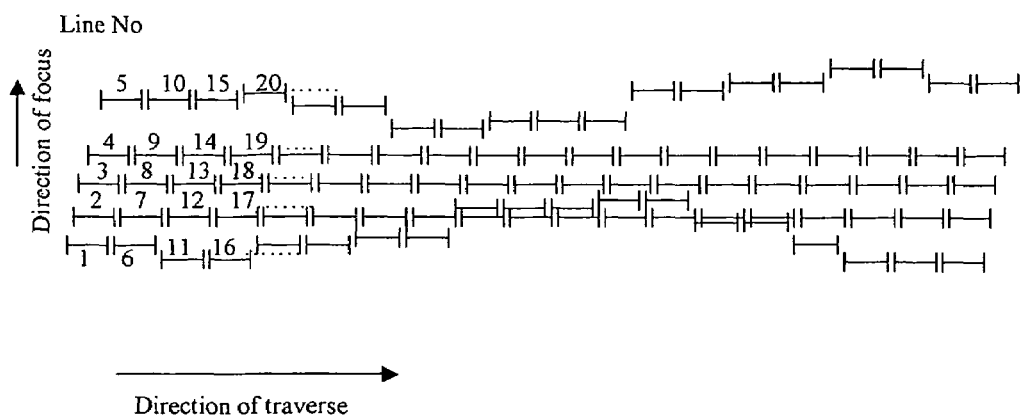
FIG. 10a shows crossing of the lower image.
Figure 10B:
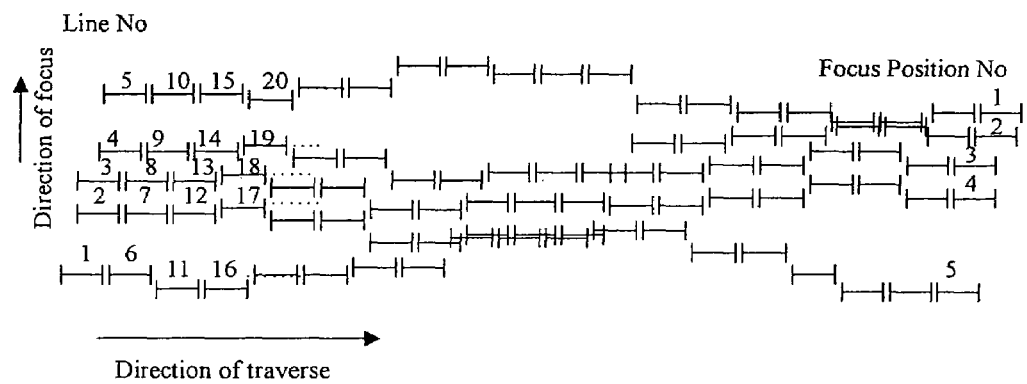
FIG. 10b shows the crossing of upper and lower focus stack images.

In some cases the focus stacks may be arranged to cross each other as is illustrated in FIGS. 10a and 10b. In FIG. 10a, the lowest image in the stack crosses the second lowest image during the scan, whereas in FIG. 10b the upper and lower images cross with their adjacent image levels, the order then starting as 1,2,3,4,5 and becoming 2,1,3,5,4 at the end of the scan.

Figure 11:
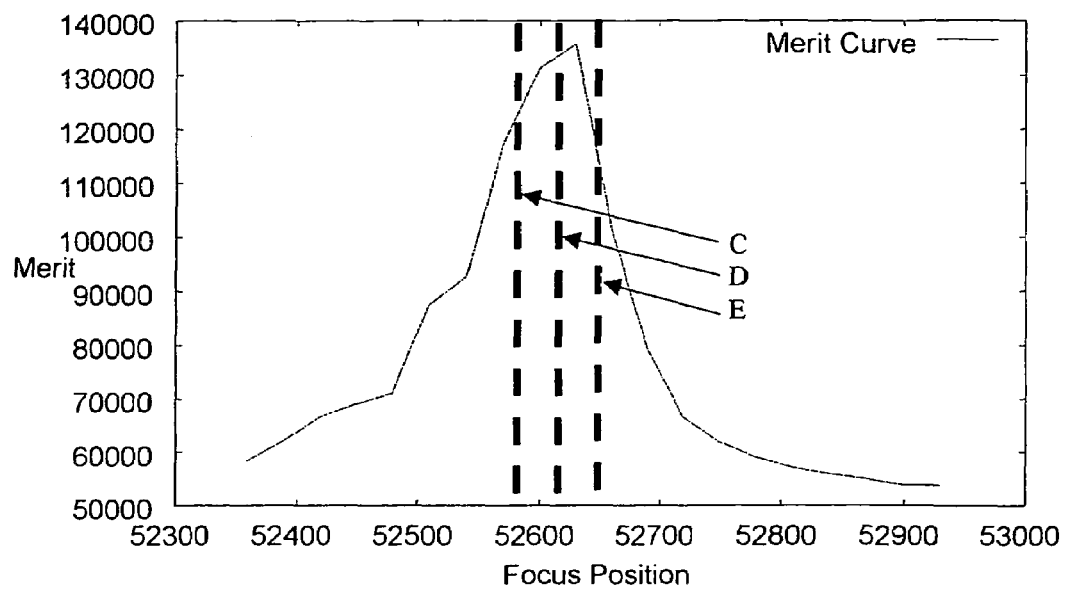
FIG. 11 shows an in focus merit curve during focus tracking.

One particular advantage of taking multiple focus stacks at once and adjusting the focus during the scan is that it is possible to track the focus of a non-planar object such as the surface of a tissue sample or rock sample. If the outer two focus positions are arranged to be on the slope of the focus curve it is possible to predict the best focus position and adjust the focus positions so as to place the central focus positions in the best focus position. This can be achieved with focus merit curve techniques as is illustrated in FIG. 11 using three focus positions C,D,E. In this way it is possible to monitor if the scanner is in focus by looking at the relative merit values of the detectors when at all three positions. If the focus moves away from the focus position then this changes the relative focus values as shown in FIG. 12.

Figure 13A:
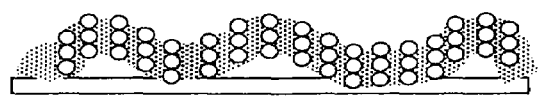
FIG. 13a shows the stack with respect to the sample.
Figure 12:
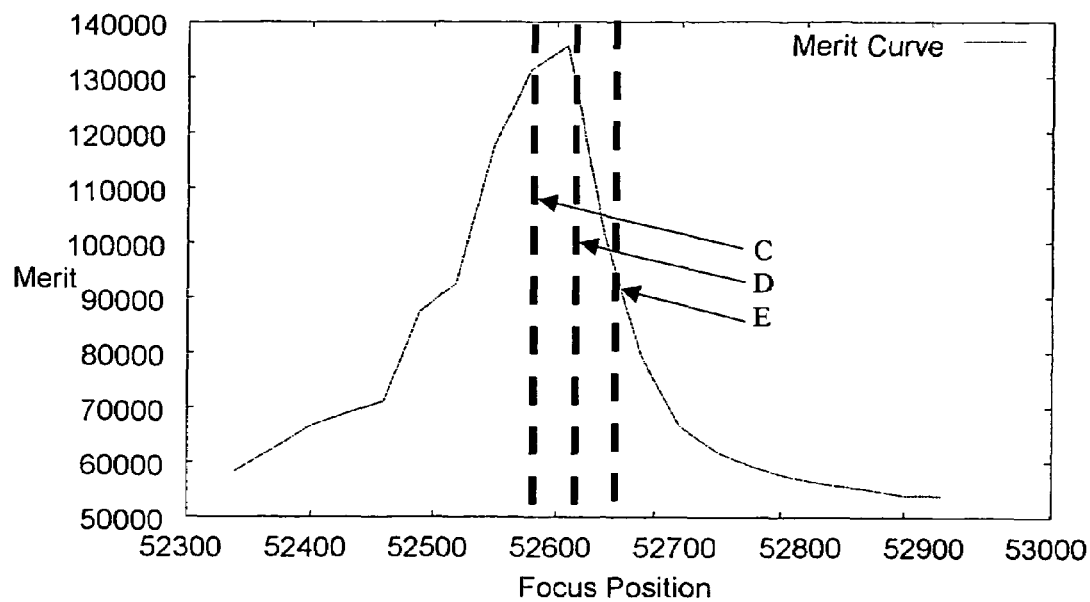
FIG. 12 shows an edge of focus merit curve during focus tracking.
Figure 13:
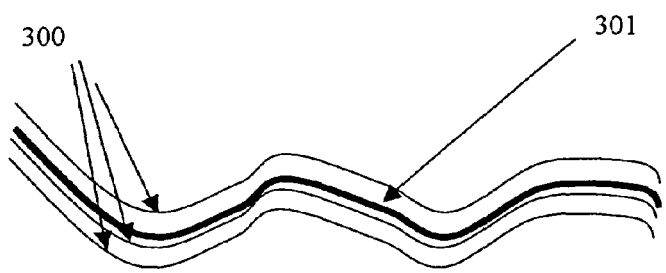
FIG. 13 shows a stack of images tracking the focus.

In comparing FIGS. 11 and 12 it can be seen that the relative merit values of the outer focus positions (C and E) change whilst the central focus positions (D) need not change. If this is monitored during scanning, then when this happens the focus can be adjusted to bring the focus positions (e.g. D) back into the centre of the focus range. This gives the capability of reducing the number of focus stacks needed for a scan as there are no areas where a focus stack is not near to image focus as shown in FIG. 13 where the stack images 300 are shown following the line of best focus across the scan 301. The great advantage of this is that time is saved without scanning more stack images with many of the images having little useful information in them for much of the image. By adjusting the nominal focus to follow the sample during scanning, fewer different focus values are therefore present at any one time. This is shown in more detail in FIG. 13a.

Figure 14:
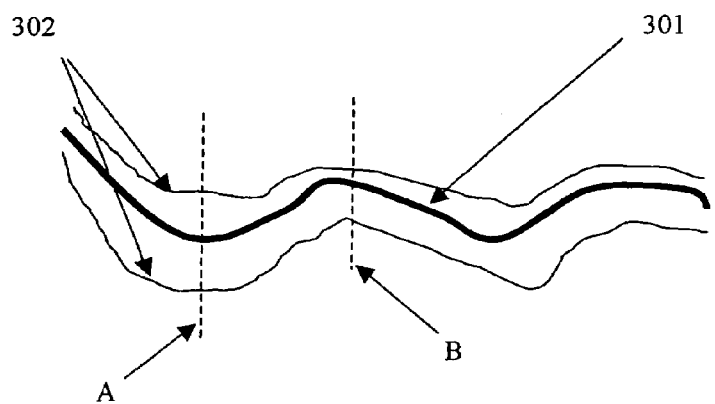
FIG. 14 shows a variation in the focal extremes of the stack image.
Figure 15:
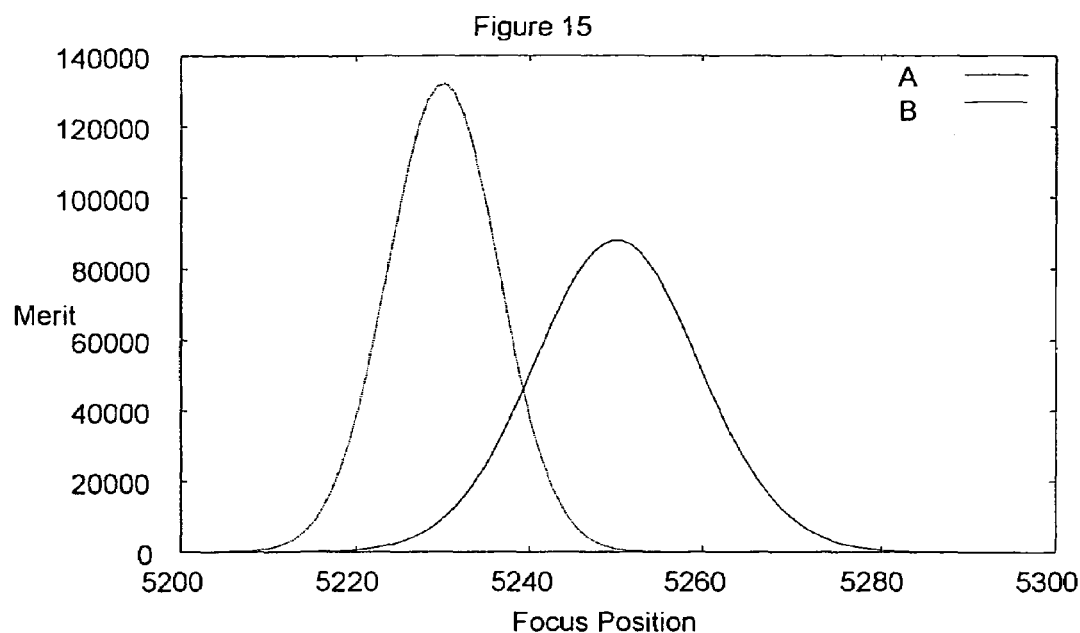
FIG. 15 shows focus merit curves at two positions of FIG. 14.

The provision of adjustable focus separations enables the scanner to set the outlying focus levels 302 to the edge of focus when the range over which the focus is of good value changes. This is shown in FIGS. 14 and 15 where FIG. 15 illustrates the merit curve at two positions A,B in the scan of FIG. 14. The conditions for this variable focus range occur for example in scanning a layer of cells where in some instances the cells are stacked upon one another in multiple layers and the number of layers changes through the scan. The idea of varying the spacing between the images in the stack as shown in FIGS. 10 and 14 provides many advantages. This functionality cannot be provided in many prior arrangements.

Figure 16:
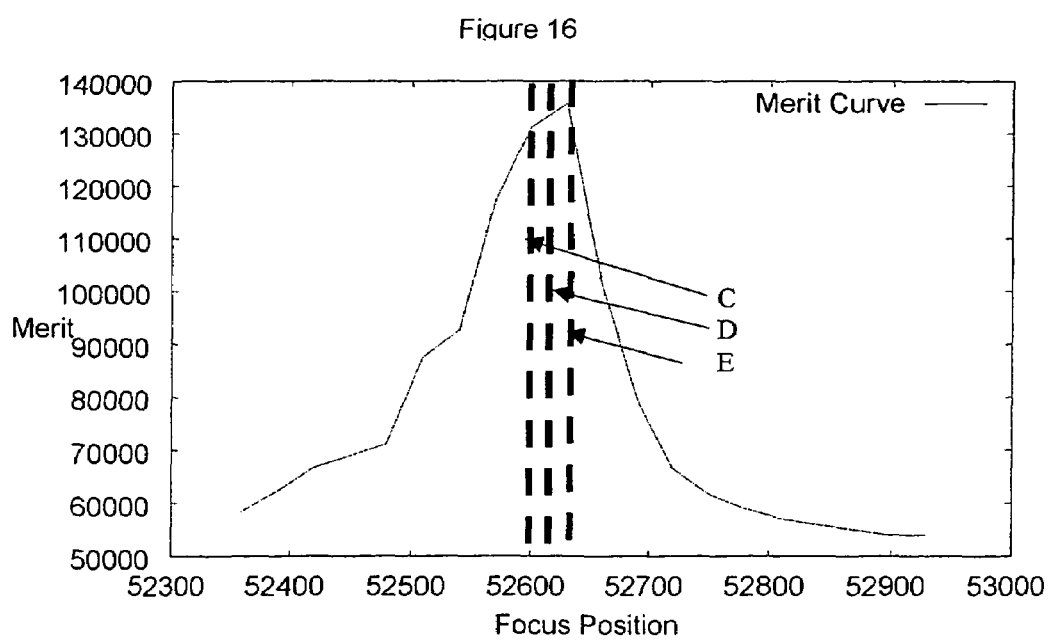
FIG. 16 shows the three outer stack image positions in focus.
Figure 17:
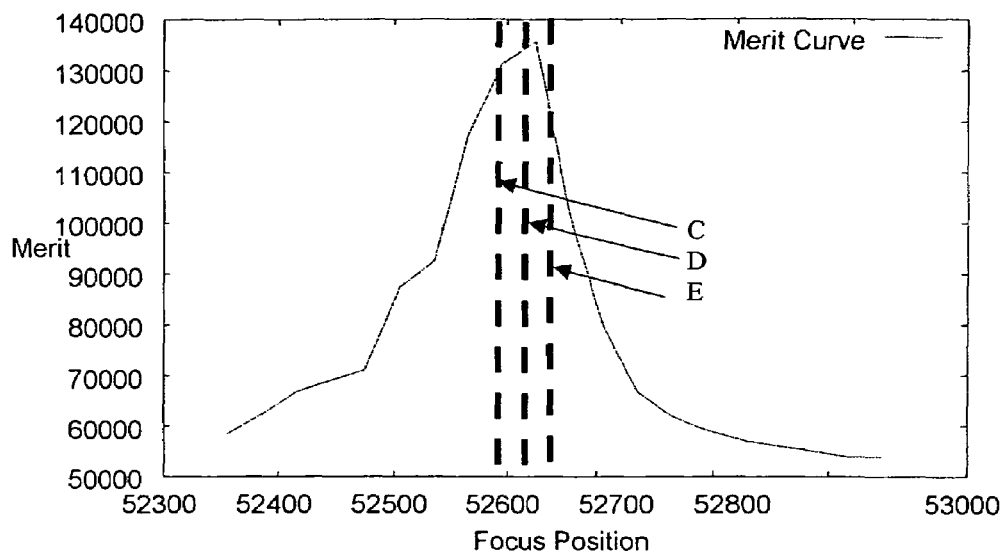
FIG. 17 shows the three positions, two being at the edge of focus.

Another embodiment has the outer focus images arranged so that they are near the edge of range of focus but not actually out of focus. Then the merit of focus is monitored to ensure that none of the detectors goes out of focus. Once one of the outer detectors shows merit values going out of focus the focus is adjusted to bring all the detectors back into focus. FIG. 16 shows three focal positions C, D, E (all in focus), whereas FIG. 17 shows the positions in focus although at the edge of focus. This enables the user to look through focus if the sample being scanned has a greater focal depth than the focus range of the scanner. It is also possible to use software to combine these images into a single image with an apparent increase in depth of focus.

Figure 18:
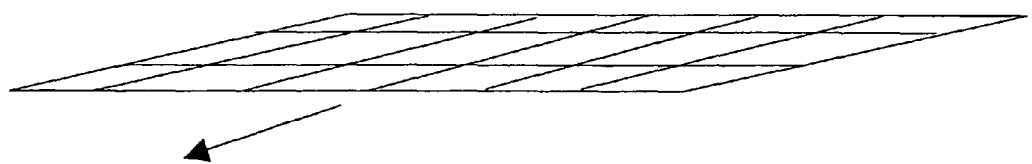
FIG. 18 shows a multiple line detector array.
Figure 19A:
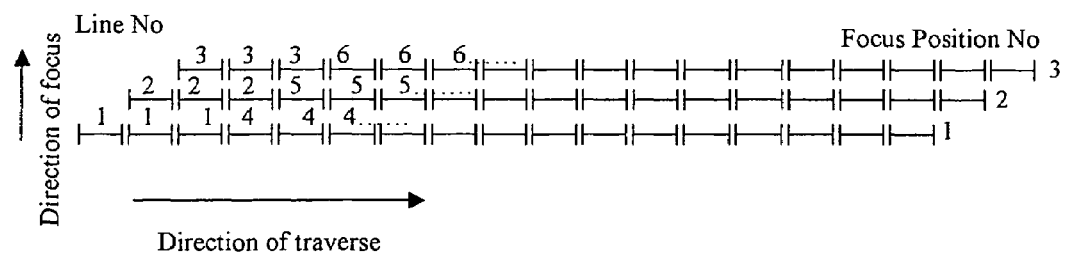
FIG. 19a shows three adjacent line detectors with a three focus stack and smooth scan.
Figure 19B:
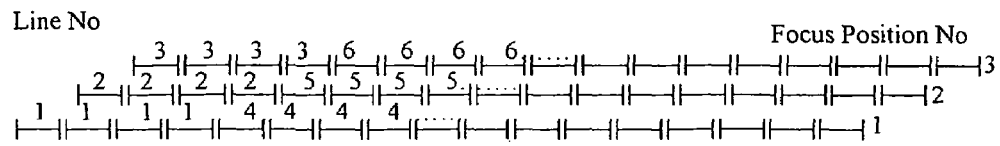
FIG. 19b shows four adjacent line detectors with a three focus stack and smooth scan.
Figure 19C:
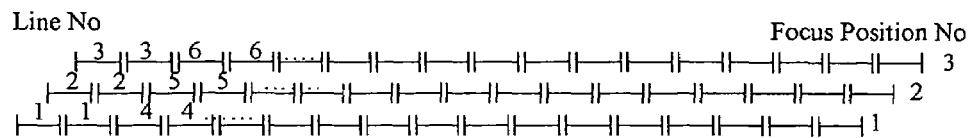
FIG. 19c shows two adjacent line detectors with a three focus stack and smooth scan.

Although we have described so far the use of only one 1D detector array it is possible to use multiple detectors to do this task with improved productivity. One embodiment is to use a three by x pixels array as shown in FIG. 18. The focus is then moved in a saw tooth-like fashion as before but at a greater traverse speed of n times where n is the number of lines detector arrays. FIGS. 19a, 19b and 19c show multiple adjacent line detectors with multiple focus positions for 3,4 and 2 line arrays respectively.

Figure 20:
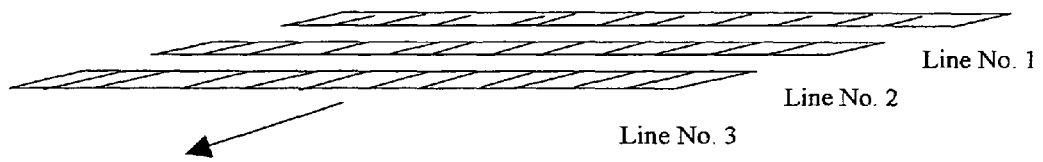
FIG. 20 shows a spaced 3 line detector array.
Figure 21A:
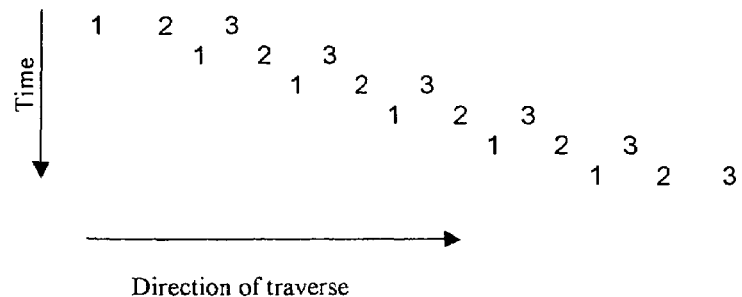
FIG. 21a shows a 3 line detector with a 2 line spacing.
Figure 21B:
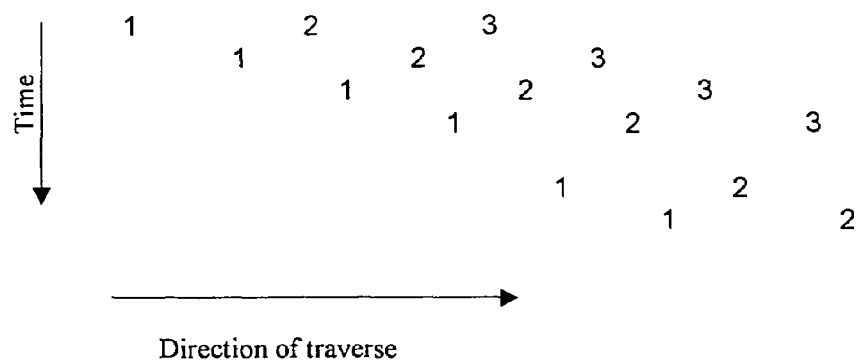
FIG. 21b shows a 3 line detector with a 5 line spacing.
Figure 21C:
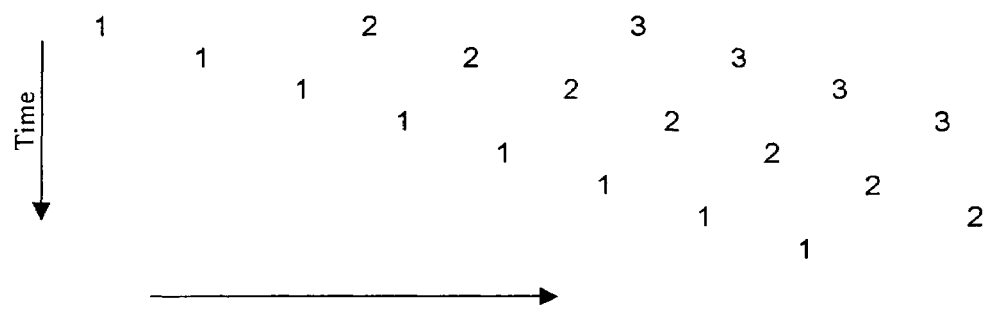
FIG. 21c shows a 3 line detector with a 8 line spacing.
Figure 22A:
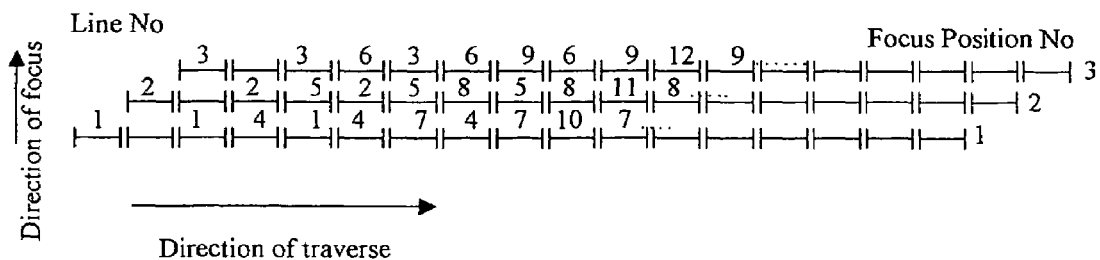
FIG. 22a shows a 3 line detector with a 2 line spacing, a three focus stack and a smooth scan.
Figure 22B:
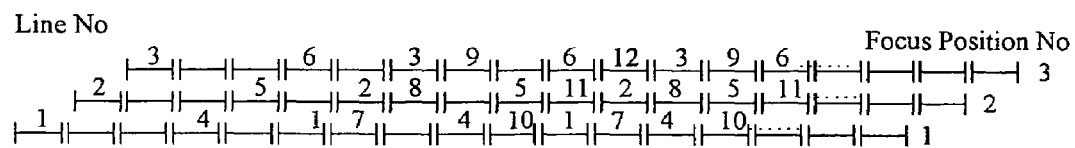
FIG. 22b shows a 3 line detector with a 5 line spacing, a three focus stack and a smooth scan; and 3 focus positions.
Figure 22C:
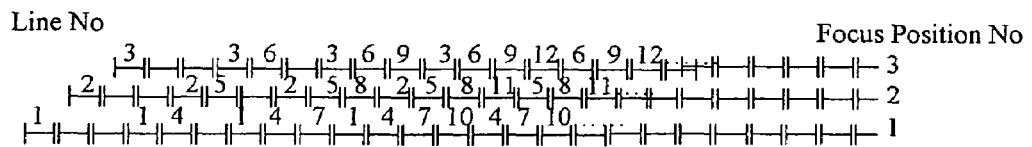
FIG. 22c shows a 4 line detector with a 3 line spacing, a three focus stack and a smooth scan.
Figure 23:
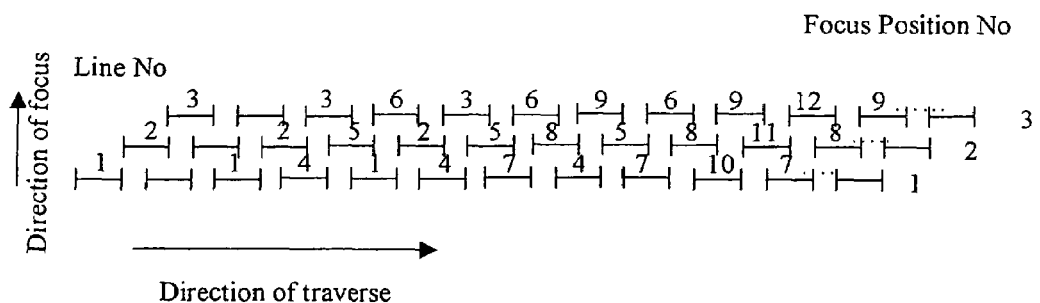
FIG. 23 shows non-adjacent line detectors with underlapped lines.

It is also not required for the multiple line detectors to have the lines adjacent to each other. It is therefore possible to create this scanning process with gaps between the detectors as shown in FIG. 20. In this condition though there are restrictions on the relationship of the line spacing of the detectors. For an integer scan line spacing the spacing between 1D arrays of detectors must be mn−1 where m is the number 1D arrays of detectors and n is an integer not equal to zero (The zero case is the same as adjacent lines). Then the scanning speed must be set to m. This then gives scanning patterns as shown in FIGS. 21a to c and FIGS. 22a to c. In FIG. 21a the number quoted is the line number of the 1D detector array and in this case the number of lines is 3, their separation 2 (m=3, n=1). For FIG. 21b No. lines=3, separation=5 (m=3, n=2). For FIG. 21c No. lines=3, separation=8 (m=3, n=3). In FIG. 22a No. lines=3, separation=2. (m=3, n=1) and there are three focus positions. In FIG. 22b No. lines=3, separation=5. (m=3, n=2) and three focus positions. In FIG. 22c No. lines=4, separation=3. (m=4, n=1) and three focus positions. It is not always necessary to have an integer line spacing between the detectors as it is still possible, and even desirable to scan with overlapped or "underlapped" lines as shown in FIG. 23 in which No. lines=3, separation=2.5, scan line separation=2 and three focus positions.

Figure 24:
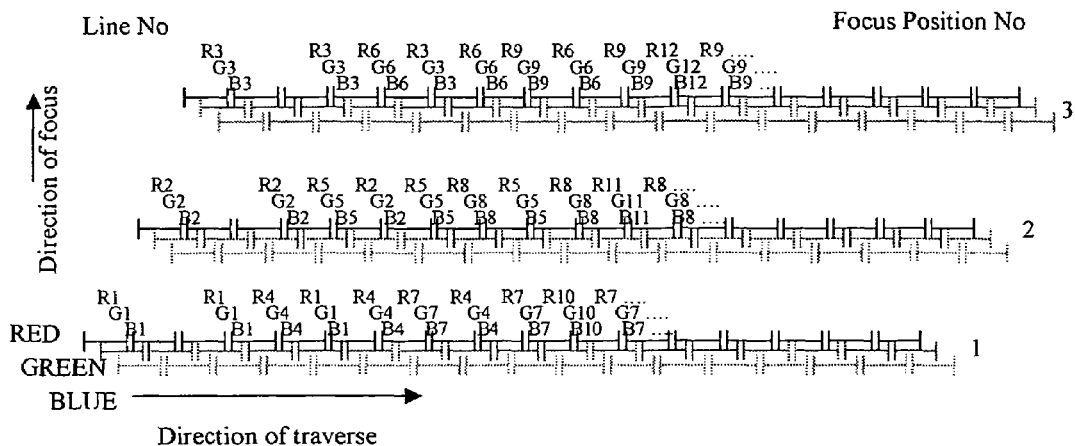
FIG. 24 shows RGB scanning with switching light, a 3 line detector with a 2 line spacing and 3 focus positions.

In order to produce colour or multi-channel images it is possible to change the colour of the illumination on a line-by-line basis and traverse slower by a factor of the number of channels. For example for three colour RGB scanning it would be required to use a traverse speed of a third of the mono speed as illustrated in FIG. 24 in which RGB scanning occurs with switching light, No. lines=3, separation=2. (m=3, n=1) and three focus positions.

Figure 25A:
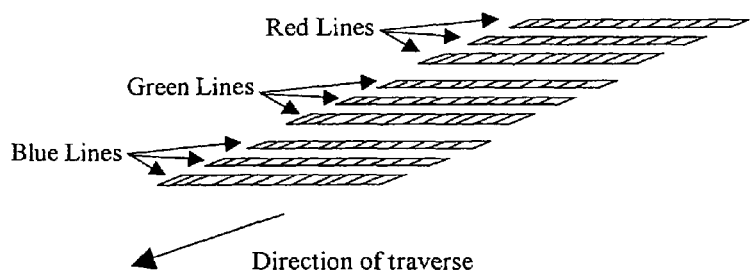
FIG. 25a shows multiple detectors arranged in colour groups.
Figure 25B:
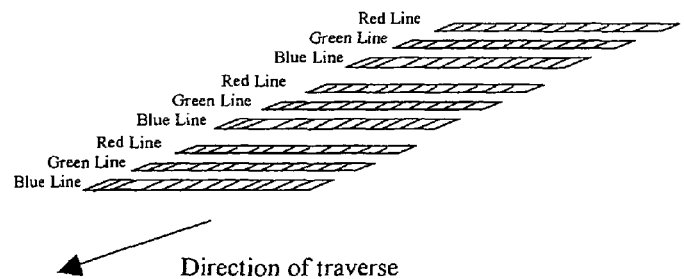
FIG. 25b shows multiple detectors arranged in colour sequences.

Another way of creating RGB colour information is to put Red, Green and Blue filters over separate lines of the detector. Such combinations may include grouping all the same colour lines together as shown in FIG. 25(a) or grouping the colour sequences together as shown in FIG. 25(b). It is important to note that if no overlap or underlap of the coloured lines is required then the same restrictions on "same colour line—same colour line" spacing apply as for the mono line spacing.

In all of the cases where the number of focus plane is less than the number of 1D arrays used it is required that the time the detector detects light is less than the time it takes to move to the next position number to prevent motion blur. For example for a four line detector with a single focus plane the light detection time should be less than a quarter of the motion time. It is also not necessary to have a single detector system as shown in FIGS. 18,20 and 25a,b.

Figure 26A:
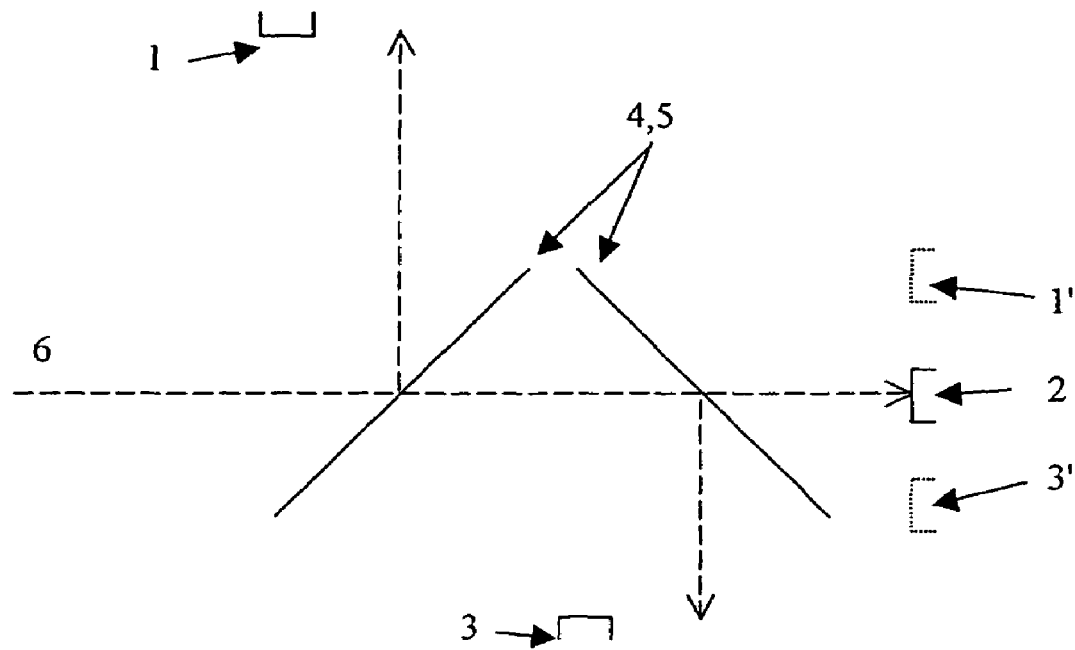
FIG. 26a shows apparatus containing two beam splitters and three arrays.
Figure 26B:
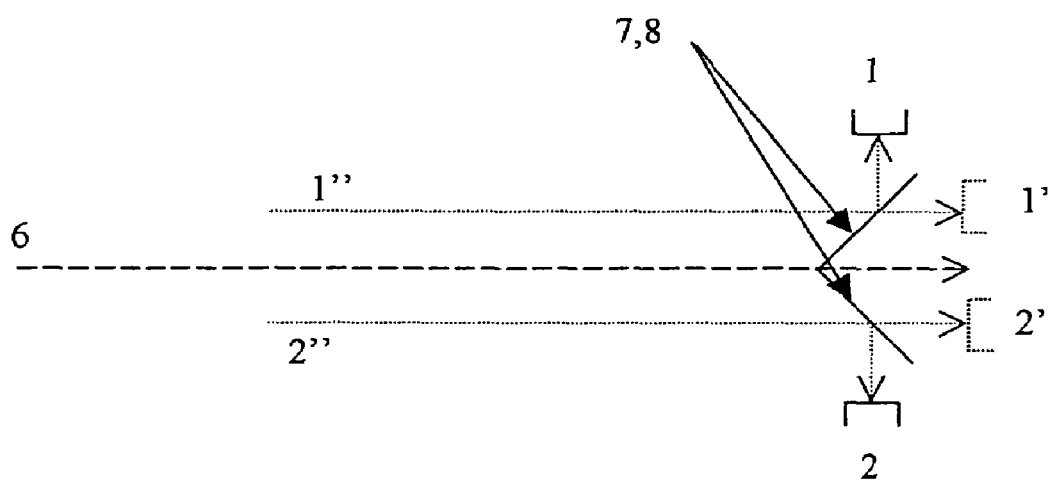
FIG. 26b shows a two array, two mirror arrangement.
Figure 26C:
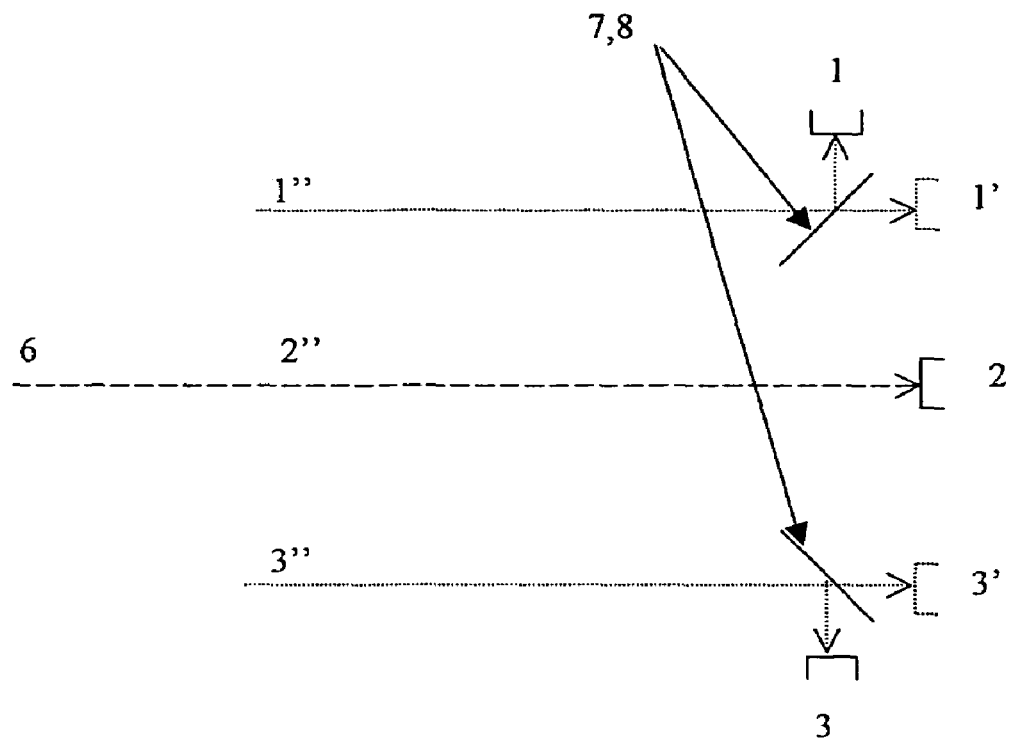
FIG. 26c shows a three array, two mirror arrangement.

Single lines of detectors such as that shown in FIG. 3 can be combined in a variety of methods of optical overlapping as shown in FIGS. 26a to c such that the detectors are all on the same focal plane. FIG. 26a shows the use of an apparatus containing two beam splitters 4,5 and three arrays 1,2,3. The virtual images of arrays 1,3 are shown at 1',3' respectively. The optic axis is shown at 6. The spacing of the detector arrays is two scan lines (m=3, n=1). FIG. 26b shows a two array, two mirror 7,8 arrangement with a line spacing of 2 (m=3, n=1). The chief rays of arrays 1 and 2 are shown at 1" and 2" respectively. FIG. 26c shows a three array 1,2,3, two mirror 7,8 system with a line spacing of 8 (m=3, n=3).

If the arrangement is set to not have the detectors on the same plane, then, when any adjustment of the relative focus planes is required during scanning, the detectors will have to be moved relative to each other and this would make variable non-uniform focus plane separation difficult to implement or large numbers of non-uniform focus stacks would require large numbers of detectors so every focus plane was scanned simultaneously. Other methods of combining detectors include fibre bundles, physically abutting detectors together and micro-prismatic arrays arranged at the imaging lens.

Figure 27A:
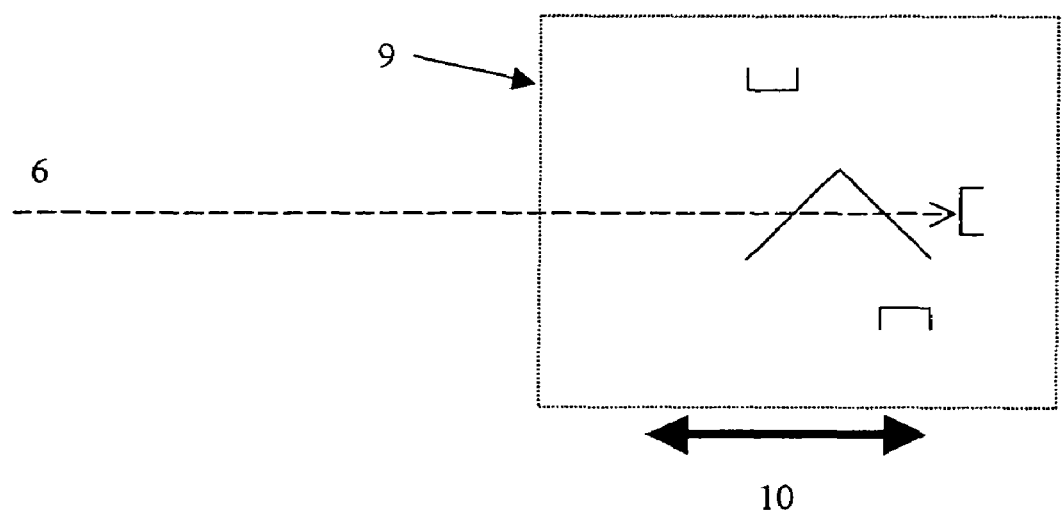
FIG. 27a illustrates the movement of the detector head.
Figure 27B:
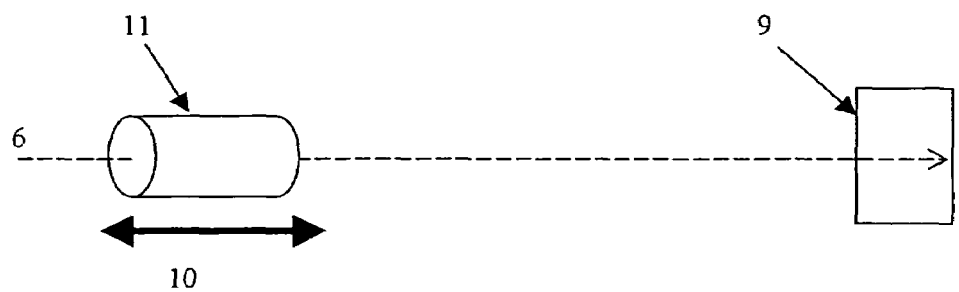
FIG. 27b illustrates movements of an imaging lens.
Figure 27C:
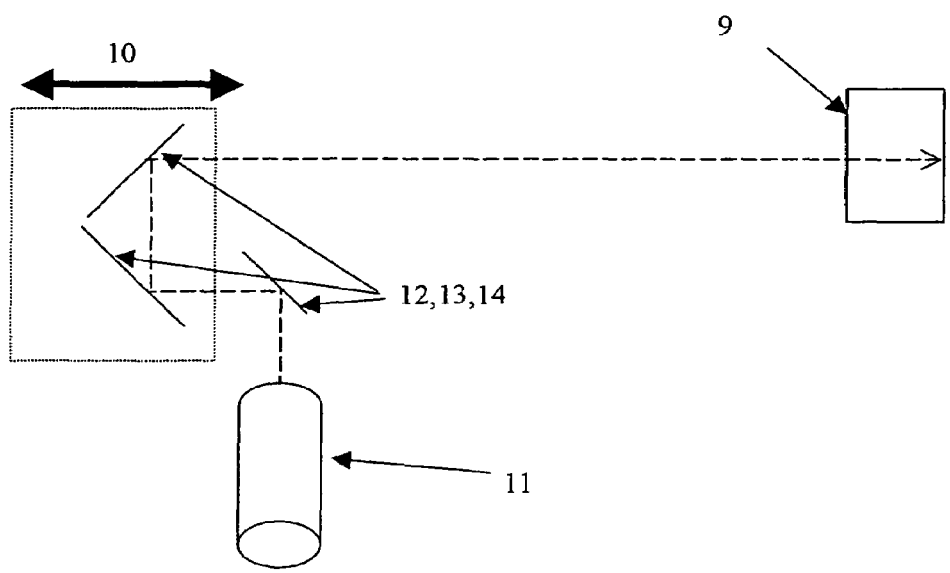
FIG. 27c illustrates the use of moveable beam folding mirrors.
Figure 27D:
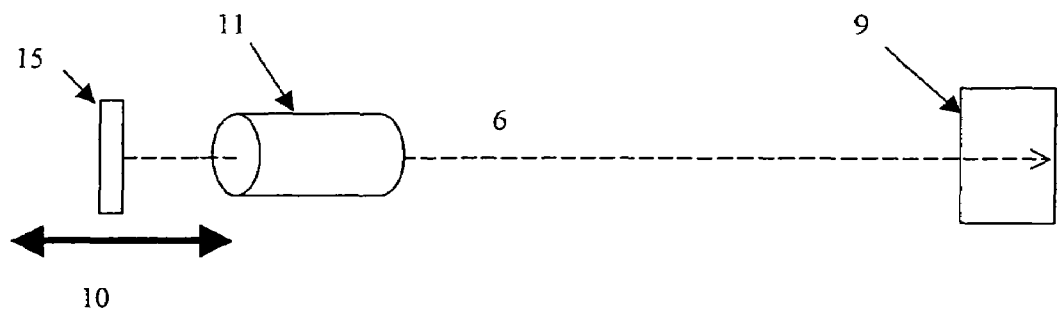
FIG. 27d shows movement of the sample.
Figure 27E:
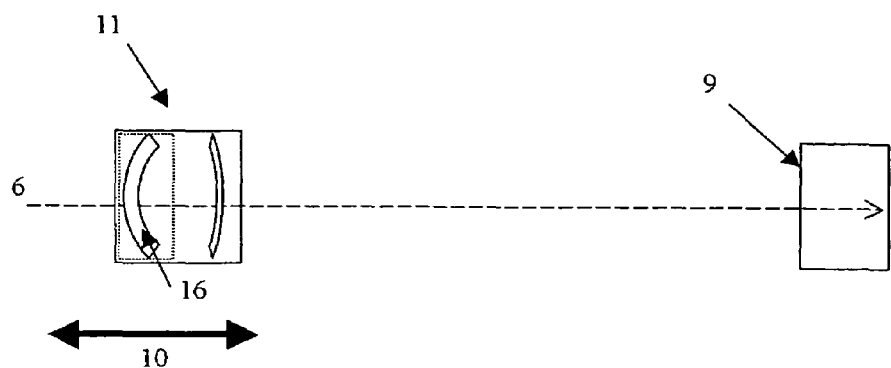
FIG. 27e illustrates moving components within an imaging lens.
Figure 27F:
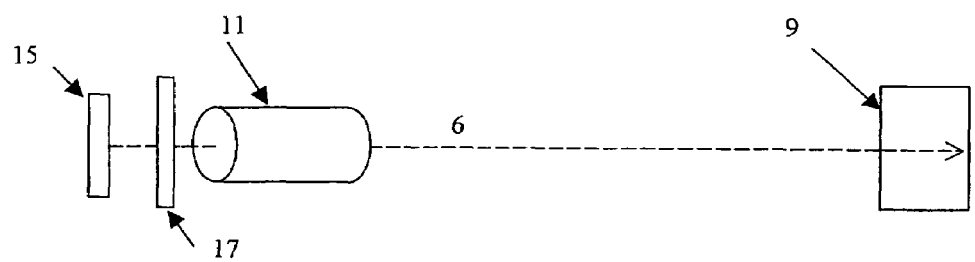
FIG. 27f shows an adjustable optical thickness example.
Figure 27G:
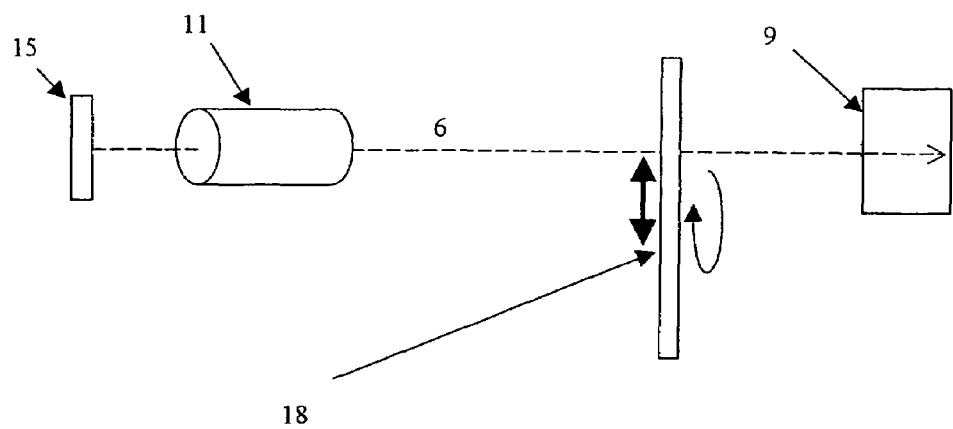
FIG. 27g uses rotating windows of variable optical thickness.
Figure 28:
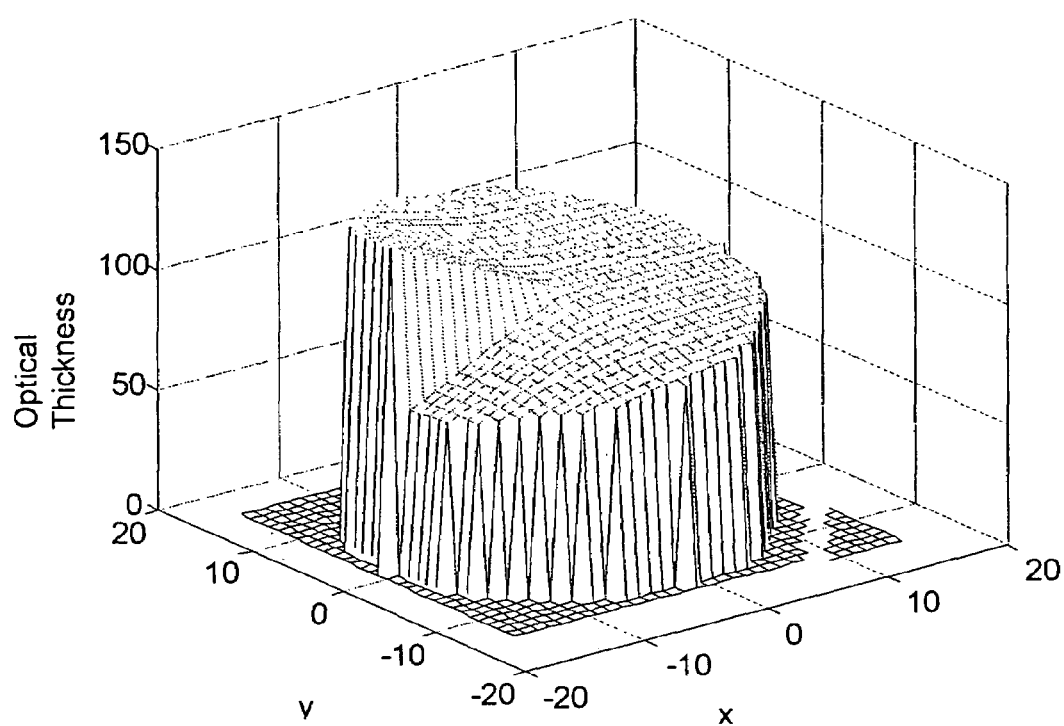
FIG. 28 shows the profile of a variable optical thickness.

There are a number of possible ways of adjusting the focus during the scanning some of which are illustrated in FIGS. 27a to g. FIG. 27a illustrates the movement of the detector head 9 including a two beam splitter system with 3 arrays. The range of focus movements is shown at 10. FIG. 27b illustrates an alternative example using movements of an imaging lens 11 intermediate between the sample and the detector. FIG. 27c illustrates achieving the focus using moveable beam folding mirrors 12,13,14. FIG. 27d shows how the focus modulation can be achieved by moving the sample 15. FIG. 27e illustrates achieving focus variation by moving components 16 within an imaging lens 11. FIG. 27f shows alternative apparatus in which windows 17 of adjustable thickness such as electro-optical active quartz windows are provided on the sample side. Focus movements are caused by the varying optical thickness of the window. FIG. 27g uses rotating windows 18 of variable optical thickness. Focus movements here are caused by varying the optical thickness of the window. The window has a profile of varying optical thickness as a function of rotation about its axis (that is, around the circumference) and/or varying optical thickness in the radial direction. This is shown in greater detail in FIG. 28.

The arrangements described herein are quite different to those of the prior art where multiple detectors are used to capture the image with each detector at a different focus position. In contrast, with the present invention in many cases we can use a single detector as shown in FIG. 3 for example. We then change the focus on a line by line basis to create the multiple focus values. This is shown in FIGS. 5 to 10. We can also use multiple detectors such as in FIGS. 18 to 25 but at any one time the detectors are in the same focus position.

In summary, a line scanning method is therefore provided for producing multiple focus stack images in one pass. A 1D (typically) array of detectors is traversed in a direction perpendicular to the axis of the array and generally in the plane of the detector surface. The focus is adjusted between scan lines for each image in the focus stack image. The process is repeated cyclically as a traverse mechanism moves to the next scan line of the first focus stack image until all the focus stack images are formed.

The detector array is typically traversed (relatively) in a direction perpendicular to the axis of the array and generally in the plane of the detector surface at a speed such that the next set of lines is taken an integer multiple of m lines worth along the image. These lines need not be the same size as sensitive area of the detectors. The speed of traverse relative to the line time may be reduced by a factor of the number of colour channels (where provided) and the colour of the illumination is changed for each channel of the image before or during each focus change.

The focus levels may be adjusted advantageously during scanning to track the region of focus. The focus levels may be used to determine the focus range by looking at the relationship of the focus merit function of at least two levels on either side of the focus region and these levels are set to the edge of the focus region, for example to keep a constant relationship between the in focus planes and the edge of focus planes.

In practical embodiments a multiple 1D array of confocal lines may produced with the use of beam splitters/mirrors/microprisms (near the imaging lens) and the array.

We claim:

1. A method of producing a multiple focus stack image of a target, the stack image comprising a plurality of images of at least a same area of the target, each image having a distinguished focus position or range of focus positions, the method comprising:
   causing, by a scanning device, relative scanning movement between the target and an away of light detectors, the array being used to repeatedly receive image information from the target during the scan in the form of scan lines; and
   causing, by a focusing device, a relative focus between the target and the array to be modified between said focus positions or ranges of focus positions of the respective images during the scan, so as to obtain the images in the stack,
   wherein each image is formed from the image information obtained as scan lines at the respective focus positions or ranges of focus positions during the scan; and
   wherein the multiple focus stack image is obtained within a single scan of the target.

2. A method according to claim 1, wherein the method is repeated for a number of swathes of the target.

3. A method according to claim 1, wherein, following obtaining a scan line from the target for a particular image in the stack, the relative focus is modified so as to obtain a scan line for at least one other image in the stack before a further scan line is obtained for the said particular image.

4. A method according to claim 3, wherein, during the scan, the scan lines are obtained for each image sequentially such that the focus is repeatedly cycled between the images.

5. A method according to claim 4, wherein the relative movement is halted during each cycle.

6. A method according to claim 1, wherein the scanning movement is substantially continuous.

7. A method according to claim 6, further comprising interpolating the obtained image information for each image so as to form corresponding images having different focus positions or ranges of focus positions within the stack.

8. A method according to claim 1, wherein the away is a one-dimensional array defining a first direction.

9. A method according to claim 8, wherein the relative scanning movement is substantially perpendicular to the first direction.

10. A method according to claim 1, wherein the focus positions or ranges of focus positions are evenly spaced in focus with respect to one another.

11. A method according to claim 1, wherein the focus positions or ranges of focus positions are unevenly spaced in focus with respect to one another.

12. A method according to claim 11, wherein when ranges of focus positions are used, the ranges of focus positions are non-overlapping.

13. A method according to claim 11, wherein when ranges of focus positions are used, the ranges of focus positions are overlapping.

14. A method according to claim 1, further comprising, when ranges of focus positions are used, using the image information during the scan to modify the focus for obtaining subsequent image information for the regions for each image.

15. A method according to claim 14, further comprising obtaining a merit curve as a function of focus position.

16. A method according to claim 15, further comprising controlling the focus for images in the stack so as to span an ideal focus position for a particular region.

17. A method according to claim 16, wherein the focus of the centre-most image(s) in the stack are arranged to correspond to the ideal focus position for the regions.

18. A method according to claim 1, further comprising combining the images in the stack so as to produce an output image having a depth of focus according to the focus positions or ranges of focus positions of the images from which it is constructed.

19. A method according to claim 1, wherein the away comprises a plurality of pixels arranged in substantially the scanning direction in sub-arrays.

20. A method according to claim 19, wherein the sub-arrays are spaced apart in substantially the scanning direction.

21. A method according to claim 20, wherein each sub-array is adapted to receive light of a corresponding colour.

22. A method according to claim 21, wherein for each of the images the image information is obtained from adjacent regions and wherein m sub-arrays are provided and wherein the sub-array spacing, in units of the region widths as seen by the array, is m times n−1, where n is a non-zero integer, such that image information from different regions obtained at different times is interleaved.

23. A method according to claim 1, wherein the speed of the relative movement is determined according to the dimensions and positioning of the array.

24. Apparatus for producing a multiple focus stack image of a target, the stack image comprising a plurality of images of at least a same area of the target, each image having a distinguished focus position or range of focus positions, the apparatus comprising:
   an array of light detectors for receiving image information from a target in the form of scan lines;
   a scan device for providing relative movement between the array and the target;
   a focus device for controlling the relative focus between the array and the target, and
   a control system for operating the scan device for causing relative scanning movement between the target and the away of light detectors; and further adapted for controlling the array to repeatedly receive image information from the target during the scan; and for operating the focus device for causing the relative focus between the target and the away to be modified between said focus positions or ranges of focus positions of the respective images during the scan, so as to obtain the images in the stack, wherein each image is formed from the image information obtained at the respective focus positions or ranges of focus positions during the scan; and
   wherein the multiple focus stack image is obtained within a single scan of the target.

25. Apparatus according to claim 24, wherein the away comprises a one dimensional array.

26. Apparatus according to claim 24, wherein the array comprises plurality of sub-arrays arranged in a direction substantially perpendicular to the direction of scanning.

27. Apparatus according to claim 26, wherein m sub-arrays are provided and spaced such that the corresponding obtained image information from the regions is spaced in the image in integers of the dimension of the regions in substantially the direction of scanning.

28. Apparatus according to claim 26, wherein the sub-arrays each comprise filters so as to receive light corresponding to particular colours.

29. Apparatus according to claim 27, further comprising beam splitters so as to provide for the physical separation of the sub-arrays and the virtual spacing of the sub-arrays.

30. Apparatus according to claim 24, wherein the focus device effects the focus by movement of the array.

31. Apparatus according to claim 24, further comprising an imaging lens and wherein the focus device effects the focus by movement of the imaging lens or component parts of the imaging lens.

32. Apparatus according to claim 24, further comprising fold mirrors and wherein the focus device effects the focus by movement of the fold mirrors.

33. Apparatus according to claim 24, wherein the focus device effects the focus by movement of the target.

34. Apparatus according to claim 24, further comprising a window of controllable optical thickness, wherein the focus device effects the focus by operation of the window.

35. Apparatus according to claim 34, wherein the window is formed from an electrooptical material.

36. Apparatus according to claim 35, wherein the window is rotatable and of variable optical thickness as a function of the rotation angle.

37. Apparatus according to claim 24, wherein the apparatus forms part of a microscope system for imaging microscopic targets.

* * * * *